United States Patent
Zhang et al.

(10) Patent No.: US 12,482,289 B2
(45) Date of Patent: Nov. 25, 2025

(54) DETECTION OF PHYSICAL TAMPERING ON DOCUMENTS

(71) Applicant: PAYPAL, INC., San Jose, CA (US)

(72) Inventors: Jiazheng Zhang, Singapore (SG); Yuzhen Zhuo, Singapore (SG); Jiyi Zhang, Singapore (SG)

(73) Assignee: PAYPAL, INC., San Jose, CA (US)

( * ) Notice: Subject to any disclaimer, the term of this patent is extended or adjusted under 35 U.S.C. 154(b) by 713 days.

(21) Appl. No.: 17/850,602

(22) Filed: Jun. 27, 2022

(65) Prior Publication Data

US 2023/0419715 A1 Dec. 28, 2023

(51) Int. Cl.
*G06V 30/418* (2022.01)
*G06V 30/413* (2022.01)
*G06V 30/42* (2022.01)

(52) U.S. Cl.
CPC .......... *G06V 30/418* (2022.01); *G06V 30/413* (2022.01); *G06V 30/42* (2022.01)

(58) Field of Classification Search
None
See application file for complete search history.

(56) References Cited

U.S. PATENT DOCUMENTS

| | | | | |
|---|---|---|---|---|
| 7,908,645 B2 * | 3/2011 | Varghese | ............... | G06F 21/552 715/833 |
| 10,872,488 B2 * | 12/2020 | Azanza | ................ | G06V 30/416 |
| 2022/0020113 A1 * | 1/2022 | Meschiari | ............... | G06T 3/403 |

FOREIGN PATENT DOCUMENTS

CN 111415364 A * 7/2020 ............... G06T 7/13

OTHER PUBLICATIONS

Rosebrock, Adrian. âRemoving Contours from an Image Using Python and OpenCV.â PyImageSearch, Feb. 9, 2015, https://web.archive.org/web/20150211231529/https://pyimagesearch.com/2015/02/09/removing-contours-image-using-python-opencv/. (Year: 2015).*
Elgammal, Ahmed, Yan Kang, and Milko Den Leeuw. "Picasso, matisse, or a fake? Automated analysis of drawings at the stroke level for attribution and authentication." Proceedings of the AAAI Conference on Artificial Intelligence. vol. 32. No. 1. 2018. (Year: 2018).*
Liang, Jian, Daniel DeMenthon, and David Doermann. "Flattening curved documents in images." 2005 IEEE Computer Society Conference on Computer Vision and Pattern Recognition (CVPR'05). vol. 2. IEEE, 2005. (Year: 2005).*

(Continued)

*Primary Examiner* — Matthew C Bella
*Assistant Examiner* — Johnny B Duong
(74) *Attorney, Agent, or Firm* — Haynes and Boone, LLP

(57) ABSTRACT

Methods and systems are presented for detecting physical tampering on a document based on analyzing an image of the document. When the image of the document is obtained, multiple contours are identified in the image based on pixel characteristics of the image. Dimension attributes of the contours are determined. Contours that are determined to correspond to borders or texts of the documents based on the dimension attributes are eliminated. A second text detection process based on a polygon method is performed on at least one remaining contour to determine whether the at least one remaining contour links multiple text elements together. The document is determined to have been physically manipulated when at least on contour remains in the image.

20 Claims, 8 Drawing Sheets

(56) References Cited

OTHER PUBLICATIONS

Roy, Partha Pratim. Multi-oriented and multi-scaled text character analysis and recognition in graphical documents and their applications to document image retrieval. Universitat Autànoma de Barcelona, CH 3, 2011. https://ddd.uab.cat/record/99226. (Year : 2011).*

Rosebrock, Adrian. "Removing Contours from an Image Using Python and OpenCV". PyImageSearch, Feb. 9, 2015, https://web.archive.org/web/20150211231529/https://pyimagesearch.com/2015/02/09/removing-contours-image-using-python-opencv/. (Year: 2015).*

Ghanmi, Nabil, Cyrine Nabli, and Ahmad-Montaser Awal. "CheckSim: A reference-based identity document verification by image similarity measure." International Conference on Document Analysis and Recognition. Cham: Springer International Publishing, 2021. (Year: 2021).*

Gonzalez, Sebastian, Andres Valenzuela, and Juan Tapia. "Hybrid two-stage architecture for tampering detection of chipless ID cards." IEEE Transactions on Biometrics, Behavior, and Identity Science 3.1 (2020): 89-100. (Year: 2020).*

* cited by examiner

US 12,482,289 B2

DETECTION OF PHYSICAL TAMPERING ON DOCUMENTS

BACKGROUND

The present specification generally relates to digital image analysis, and more specifically, to a framework for analyzing a digital image of a document to detect potential physical tampering on the document according to various embodiments of the disclosure.

RELATED ART

Forgery in proof-of-identity (POI) documents has caused significant amounts of losses for companies every year. Many companies (e.g., online service providers) require submissions of POI documents from users, as part of a process to verify the identities of the users, in order to grant the users access to functionalities (e.g., particular types of transactions, such as a fund transfer transaction above a particular amount, etc.) and/or data. By verifying the identities of the users using the POI documents, the risk of the users performing malicious transactions (e.g., abusing the functionalities of the company's platform) may be greatly reduced. However, when the POI document submitted by a user is forged (e.g., where the information that appears on the POI document is false), the risk associated with the user would be inaccurately assessed by the company. Thus, the user may be granted access to functionalities and data that should not have been granted to the user if truthful information of the user were used to assess the risk associated with the user.

Software applications have been developed to detect the presence of forgery in an image. However, most of the existing solutions focus on detecting digital manipulation of the images. While these existing solutions may be good at detecting manipulation of the images of documents after the images were captured, they are unable to detect tampering of the physical documents. As such, there is a need for providing a framework that can analyze a digital image of a document to detect potential physical tampering of the document.

Figure 1:
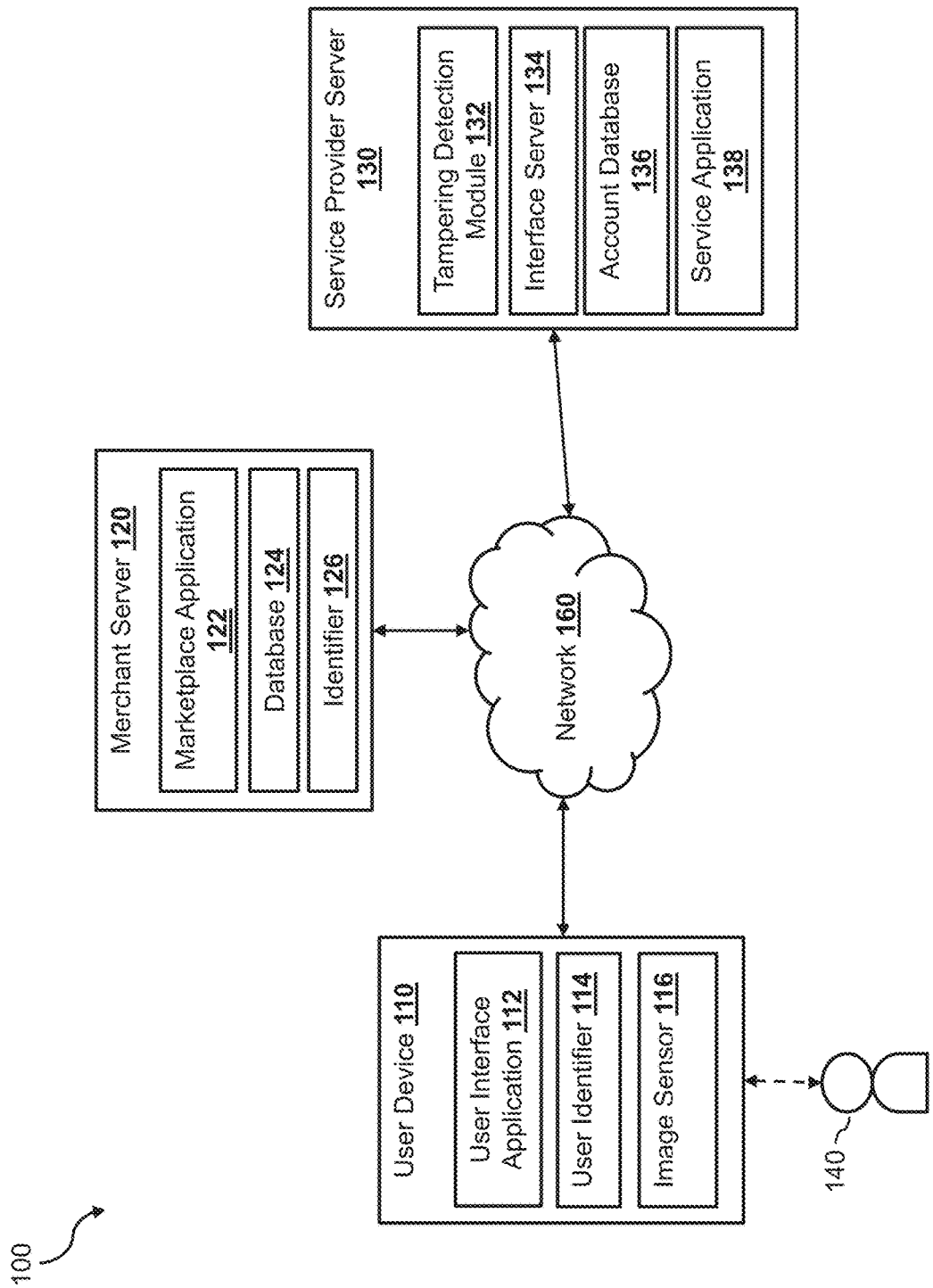
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting physical tampering on a document based on analyzing an image of the document. As discussed herein, an online service provider may require its users to submit proof-of-identity (POI) documents (e.g., images of the POI documents) in order to verify the users' identities. By verifying the users' identities based on the POI documents, the online service providers may greatly reduce the risk associated with performing transactions for those verified users, as the verified users whose identities have been verified are less likely to conduct malicious transactions with the online service provider than unverified users. In some embodiments, the online service provider may also provide the verified users access to additional functionalities and/or data based on their identity verification statuses. However, malicious users have attempted to circumvent the identity verification requirements of the online service provider by submitting forged POI documents.

The malicious users can create forged POI documents using one of two methods—by manipulating an image of the document digitally after the image is captured or by physically tampering with the physical POI document. Using the first method, an image of a POI document can be digitally manipulated using an image editing software such as Adobe® Photoshop®, etc. Conventional document tampering detection solutions have focused on detecting digital manipulation of images. Using the second method, the POI document can be physically manipulated (e.g., tampered with) before an image of the manipulated POI document is captured. For example, a sticker with forged date-of-birth information may be taped over an area of the POI document associated with a date-of-birth field such that the forged date-of-birth information, instead of the real date-of-birth information, is visible in the image. In another example, certain security features (e.g., a portrait of a person associated with the POI document) may be covered by a sticker so that the online service provider cannot verify the appearance of the user. In yet another example, two POI documents can be stacked on top of each other such that a first POI document may cover a portion of a second POI document when the image is captured.

These physical manipulations of POI documents are surprisingly challenging to detect using conventional image analysis systems. It is because conventional image analysis systems mostly focus on detecting digital artifacts (e.g., inconsistency in colors and/or shading, etc.) that occur when an image has been digitally manipulated. Since the images of physically manipulated POI documents do not exhibit such digital artifacts, the conventional image analysis systems would not be able to detect the physical tampering of the POI documents. Furthermore, even after a POI document has been physically tampered with, most of the characteristics associated with a POI document (e.g., a dimension of the POI document, certain security elements such as watermarks, locations of different data, etc.) are still present in the image.

Thus, according to various embodiments of the disclosure, a tampering detection system may use one or more image analysis techniques to detect physical tampering of documents. In some embodiments, the tampering detection system may detect physical tampering of documents based on an identified contour that corresponds to a boundary (e.g., an outline) of a foreign object. As defined herein, a foreign object is an object that does not belong to the document being inspected (e.g., a sticker, a piece of paper, a border of another document, etc.). In some embodiments, upon receiving an image of a document (e.g., a POI document, etc.), the tampering detection system may classify the image into one of different document types. For example, the tampering detection system may store, in a data storage, information associated with the different document types. The different document types may correspond to different POI document types (e.g., a U.S. Passport, a Spanish passport, a Hong Kong Identification Card, etc.). The information associated with the different document types may include attributes of the different document types (e.g., a dimension, a shape, locations of different elements, such as portraits of users, date of birth, identification numbers, etc.). In some embodiments, the information associated with a particular document type may also include edge-based descriptors of a document of the particular document type. The edge-based descriptors may be derived by the tampering detection system using an edge detection algorithm (e.g., a Scale Invariant Feature Transform (SIFT) algorithm, etc.) based on one or more documents of the particular document type. Thus, the tampering detection system may generate a template for each document type, where each template may include the attributes (e.g., edge-based descriptors) associated with the corresponding document type.

The tampering detection system may then compare attributes derived from the image against the attributes of the different document types to determine whether the image is a match with any one of the different document types. For example, the tampering detection system may derive edge-based descriptors from the image (e.g., using the SIFT algorithm, etc.). The tampering detection system may compare the edge-based descriptors of the image against the edge-based descriptors of the different templates to determine whether a match is found. If a match is found, the tampering detection system may classify the document in the image as the document type that corresponds to the matched template.

After classifying the document as a particular document type, the tampering detection system may perform a set of pre-processing operations on the image. For example, based on the locations of the different attributes (e.g., the different edge-based features) on the image, the tampering detection system may crop the image such that background elements in the image (e.g., areas in the image that do not show the document) may be removed. For example, an algorithm (e.g., a Random Sample Consensus (RANSAC) algorithm, etc.) may be used to determine the location of the document in the image (e.g., the four corners of the document in the image). The tampering detection system may also correct the orientation of the image (e.g., flipping the image at an angle such that the document appears upright in the image, etc.). If the image is a multi-colored image (e.g., has multiple channels such as a red channel, a blue channel, and a green channel, etc.), the tampering detection system may also convert the multi-colored image into a grayscale image (e.g.,
an image having only one channel). In some embodiments, the tampering detection system may also perform noise reduction processing on the image (e.g., by performing a median blur on the image, etc.) and then transform the image into a binary image (e.g., using Gaussian adaptive thresholding).

By transforming the image into a binary image, each pixel in the image is assigned one of two values (e.g., 1 or 0, black or white, etc.). Since the image has only one channel, the tampering detection system may assign each pixel to either of the two values based on a threshold value. For example, when the pixel value of a pixel is above the threshold value, the tampering detection system may assign that pixel a value of '1,' and when the pixel value of a pixel is below or equal to the threshold value, the tampering detection system may assign that pixel a value of '0.' In Gaussian adaptive thresholding, a different threshold value may be used for different regions in the image, based on the pixel values of the pixels within the regions, such that edges (e.g., outlines) of different features in the image (e.g., text, shape of an object, shape of a graphic, etc.) would be emphasized (e.g., assigned a value of '1') while other pixels would be de-emphasized (e.g., assigned a value of '0').

By highlighting the edges (e.g., outlines) of different features in the image, one or more contours may be generated based on the highlighted pixels in the image. As defined herein, a contour is a continuous curve defined by the highlighted pixels in the binary image. When the document has been physically tampered with using a foreign object (e.g., having a sticker or another document to cover a portion of the document, etc.), the tampering detection system would generate contours based on the outline of the foreign object when transforming the image into the binary image using the techniques described herein. However, since the tampering detection system may also generate contours based on other features of the document (e.g., texts, security features such as a water mark, portraits of a user, design elements of the document, borders of the document, etc.) when transforming the image into the binary image, the tampering detection system needs to distinguish contours that correspond to a foreign object from contours that correspond to features of the document.

In some embodiments, the tampering detection system may mask certain features in the image that may confuse the tampering detection system as artifacts that indicate a presence of physical tampering of the document (e.g., outline of a foreign object). For example, when the document includes a portrait of a person, the contours generated based on the outline of the portrait (which may include the outlines of hair, the outline of the face and other facial features, etc.) may appear to be similar to the outlines of a foreign object on the document. As such, in some embodiments, the tampering detection system may identify the area in the image that corresponds to a portrait (e.g., using a facial recognition algorithm, or based on the classification of the document), and may mask the identified area in the image (e.g., removing all the highlights in the area).

The tampering detection system may then perform two rounds of examination of the contours to eliminate any contours that do not likely correspond to outlines of foreign objects. During the first round of examination, the tampering detection system may identify and eliminate contours that correspond to borders and texts of the document in the image. Since a contour of a border of the document may occupy a substantial dimension of the binary image, in some embodiments, the tampering detection system may determine whether a contour in the binary image corresponds to a border of the document in the image based on a width attribute, a height attribute, and/or a size attribute (an area, such as a rectangular area, within the binary image that the contour occupies). Specifically, the tampering detection system may determine whether a width attribute of the contour is larger than a threshold portion of the width of the binary image (e.g., 40%, 50%, etc.), whether a height attribute of the contour is larger than a threshold portion of the height of the binary image (e.g., 40%, 50%, etc.), and/or whether a size attribute (e.g., multiplying the width by the height) of the contour is larger than a threshold portion of the size of the binary image (e.g., 40%, 50%, etc.). If it is determined that the width attribute, the height attribute, and/or the size attribute of the contour are larger than the corresponding thresholds, the tampering detection system may determine that the contour corresponds to a border of the document, and may eliminate the contour from the binary image.

In some embodiments, the tampering detection system may also use the width and height attributes of a contour to determine whether the contour corresponds to text on the document. Since texts that appear in a document are typically small in size relative to the size of the document, the tampering detection system may determine that a contour corresponds to texts on the document when the width attribute of the contour is smaller than a threshold portion of the width of the binary image (e.g., 5%, 10%, etc.) and the height attribute of the contour is smaller than a threshold portion of the height of the binary image (e.g., 8%, 12%, etc.). If it is determined that the width attribute and the height attribute of the contour are smaller than the corresponding thresholds, the tampering detection system may determine that the contour corresponds to one or more texts of the document, and may eliminate the contour from the binary image.

Using the width and height attributes of the contours can be very effective in identifying contours that correspond to individual text elements (e.g., individual letters, alphabets, characters, etc.) on the document. However, when multiple elements within the text (e.g., alphabet letters, numerals, characters, etc.) are close together (e.g., separated by a distance within a threshold), the tampering detection system may generate a continuous contour that spans across the multiple elements (e.g., linking multiple letters, numerals, and/or characters together) when converting the image to the binary image. The contour that spans across multiple elements may have a size that does not fall into the text size criteria described above. As such, the tampering detection system of some embodiments may perform an additional text detection process based on a polygon method to detect whether any remaining contour is formed by linking multiple text elements together. In some embodiments, the tampering detection system may perform this additional text detection process on all of the remaining contours, while in some embodiments, the tampering detection system may perform the additional text detection process only on the remaining contours that satisfy a set of size criteria (e.g., contours having a width smaller than a threshold portion of the binary image (e.g., 10%, 20%, etc.) and a height smaller than a threshold portion of the binary image (e.g., 8%, 16%, etc.)).

Since a contour that corresponds to multiple text elements may exhibit certain curvature characteristics (e.g., a curve that changes directions in an abrupt manner multiple times, not smooth, etc.), while a contour that corresponds to an outline of a foreign object (e.g., a sticker, another document, etc.) exhibits the opposite curvature characteristics (e.g., a curve the is smooth and does not change direction abruptly multiple times, etc.), the tampering detection system may perform the additional text detection process by analyzing the curvature characteristics of a contour. Given a contour can be constructed based on connecting many points using straight lines (the more points provided for connecting the straight lines, the smoother it looks), the tampering detection system may initially identify multiple points on the contour (e.g., 20 points, 50 points, 100 points, etc.). The tampering detection system may then recursively reduce the granularity of the contour (e.g., by discarding one or more points on the contour) until a pre-defined condition exists. For example, the tampering detection system may discard a point on the contour when the point is within a threshold distance from a hypothetical straight line that connects two other points that surround the point. In other words, points that are part of a smooth transition of the contour are eliminated while points that contribute to (or causes) drastic changes in directions of the contour would remain. In some embodiments, the threshold distance may be determined based on a perimeter length of the contour (e.g., a length of the perimeter of an area in the binary image occupied by the contour). For example, the tampering detection system may calculate the threshold distance based on multiplying a weight (e.g., 0.01, 0.05, etc.) by the perimeter length. In some embodiments, the tampering detection system may use the Douglas-Peucker algorithm to reduce the granularity of the contour, and may determine an epsilon parameter for the Douglas-Peucker algorithm based on the weight and the perimeter length (e.g., multiplying the weight by the perimeter length, etc.).

Since a contour that corresponds to texts includes more abrupt changes in directions than a contour that corresponds to an outline of a foreign object, the tampering detection system may determine whether a contour corresponds to texts based on the number of points remaining in the resulting contour. For example, the tampering detection system may determine that the contour corresponds to texts when the number of points remaining in the resulting contour is above a threshold (e.g., 15, 19, 20, 27, etc.). The tampering detection system may then eliminate the contour when the contour corresponds to texts. While a more sophisticated solution, such as using an optical character recognition (OCR) algorithm, to detect texts in the image can also be used, the polygon method described herein is superior as it is substantially faster and less consuming of computer resources.

After removing contours that correspond to the border of the document and texts from the binary image, the tampering detection system may perform a second round of examination on the remaining contours. In some embodiments, the second round of examination focuses on cleaning up miscellaneous contours that do not likely correspond to outlines of foreign objects in the binary image. For example, the tampering detection system may mask areas in the binary image that are close to the borders and the corners of the binary image (e.g., within 5%, 8%, etc. from the border or corner of the binary image, etc.). In some embodiments, the tampering detection system may also eliminate any small contours (e.g., having a size smaller than a threshold size) that also do not likely correspond to outlines of foreign objects in the binary image. For example, the tampering detection system may eliminate any remaining contours having a width attribute below a threshold (e.g., 5%, 8%, of the width of the binary image, etc.) and a height attribute below a threshold (e.g., 3%, 6% of the height of the binary image, etc.).

After eliminating the contours in the binary image through the two rounds of examination, any remaining contour(s) in the binary image would likely correspond to an outline of a foreign object on the document. As such, the tampering detection system may determine whether any contour remains in the binary image. If one or more contours remain in the binary image, the tampering detection system may determine that the document captured in the image has been physically manipulated. By contrast, if no contour remains in the binary image, the tampering detection system may determine that the document has not been physically manipulated. The tampering detection system may process a corresponding transaction request based on the determination of whether a physical tampering has occurred in the document. For example, the tampering detection system may deny the transaction request (e.g., denying the user from signing up a user account, denying the user from upgrading the user account, denying the user access to data, etc.) or imposing restrictions (e.g., limit a transaction amount, etc.) on the user account when it is determined that the image submitted by the user includes a physically manipulated document. If no physical tampering is detected, the tampering detection system may proceed with extracting information from the document in the image, and process a transaction based on the extracted information.

While the examples illustrated herein use the contour examination techniques to identify forgery in a physical documents, the contour examination techniques can also be used in other applications. For example, the polygon method can be used to detect the presence of text in an image. This is especially useful when detecting the presence of text is sufficient (e.g., detecting an empty page in a book, etc.) and the recognition of the actual text is not needed, since the polygon method is much more efficient than any other optical character recognition algorithms. In another example, the contour examination techniques can also be used to identify physical manipulation in objects other than documents (e.g., artwork such as a painting, a product for sale, etc.).

FIG. 1 illustrates an electronic transaction system 100, within which the tampering detection system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. For example, via the UI application 112, the user 140 may submit a transaction request to the service provider server 130 (e.g., a request to register a user account, a fund transfer request, etc.). In some embodiments, dependent on the type of transaction request, the service provider server 130 may require the user 140 to submit a proof-of-identity (POI) document. The user 140 may use the image sensor 116 (e.g., as part of a camera) to capture an image of a POI document (or otherwise obtain the image of the POI document from the user device 110 or other devices), and submit the image to the service provider server 130 via the UI application 112.

In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to capture an image, to add a new funding account, to perform an electronic purchase with a merchant associated with the merchant server 120, to provide information associated with the new funding account, to initiate an electronic payment transaction with the service provider server 130, to apply for a financial product through the service provider server 130, to access data associated with the service provider server 130, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items or services, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the electronic transactions (e.g., electronic payment transactions, data access transactions, etc.) among users and merchants processed by the service provider server 130. In one example, the service provider server 130 may be provided by PayPal, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. For example, the user 140 may submit a transaction request and an image of a POI document via the interface generated by the interface server 134.

The service provider server 130, in one embodiment, may be configured to maintain one or more user accounts and merchant accounts in an accounts database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a tampering detection module 132 that implements the tampering detection system as discussed herein. The tampering detection module 132 may be configured to analyze an image of a document received from a user device (e.g., the user device 110) via the interface server 134 and detect whether the document in the image has been physically tampered with (e.g., determining a likelihood that the document has been physically tampered with, etc.).

As discussed herein, users of the service provider server 130 may submit images of documents (e.g., proof-of-identity (POI) documents, etc.) to the service provider 130 through the interface generated by the interface server 134. For example, depending on a request submitted by a user (e.g., a request to register a user account with the service provider server 130, a request to perform a payment transaction, a request to remove a restriction set on a user account, etc.), the service provider server 130 may require the user to submit a POI document in order for the service provider server 130 to verify an identify of the user. The user (e.g., the user 140) may use the image sensor 116 to capture an image of a POI document and submit the image to the service provider server 130 via the UI application 112.

The service provider server 130 may extract information (e.g., a name, a gender, a date of birth, facial features from a portrait, an identity number, etc.) from the image of the document, and may verify the user information stored in the account database 136 against the information extracted from the image. Once verified, the service provider server 130 may assess a risk of the user 140 based on the extracted information, and may process the request (e.g., authorize or deny the request) based on the risk. Having the user's identity verified through the POI documents can greatly reduce the risk for the service provider server 130. However, as discussed herein, malicious users may circumvent the identity verification process by submitting forged POI documents to the service provider server 130. The forged POI documents may include false information that is not associated with the POI documents being submitted. Based on the information extracted from the forged POI documents, the service provider server 130 may incorrectly assess a risk of the user's request, and may lead to losses, such as a security breach to the service provider server 130, data losses, monetary losses, etc.

As such, before extracting the information from the image, the tampering detection module 132 of the service provider server 130 may perform an image analysis process on the image and determine whether the image of the document has been manipulated. Documents that are submitted to the service provider server 130 in the form of an image can be forged by digitally manipulating the image after the image of the document has been captured. For example, using an image editing software, a malicious user can manipulate the pixel values in the image to change the representation of the POI document in the image (e.g., replacing the portrait with another portrait digitally, changing the date of birth, etc.). In some embodiments, the tampering detection module 132 may use an editing detection software to detect any digital manipulation of the image. Most of the editing detection software focuses on detecting digital manipulation of the image based on inconsistency in lighting (or shading) and contrast of different areas of the image.

Figure 2A:
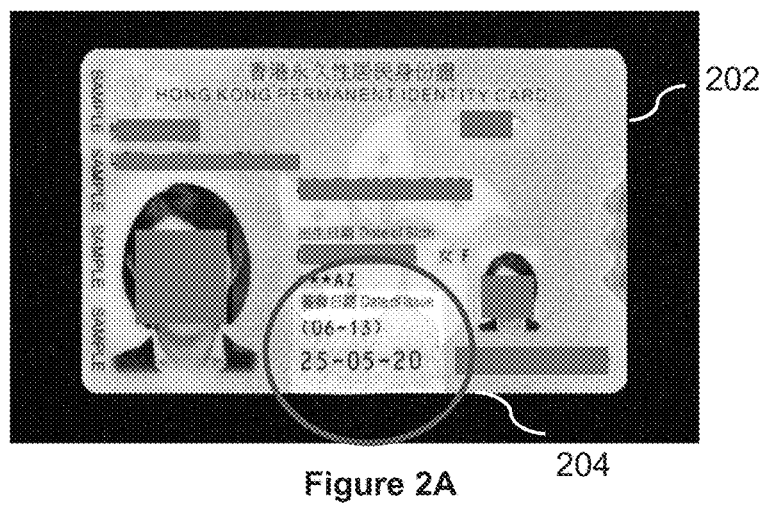
FIGS. 2A-2C illustrates various examples of physical tampering on a document according to an embodiment of the present disclosure.
Figure 2B:
Figure 2C:

A forged document can also be generated by physically manipulating (or tampering with) the document before capturing an imaged of the manipulated document. For example, a sticker with forged information (e.g., a forged date of birth) may be taped over an area of the POI document (e.g., an area associated with a date-of-birth field). In another example, certain security features (e.g., a portrait of the person associated with the POI document) may be covered by a sticker. In yet another example, two POI documents can be stacked on top of each other such that a first POI document may cover a portion of a second POI document when the image is captured (e.g., a top POI document includes a cutout area such that the corresponding area of the bottom POI document is visible on the image). FIGS. 2A-2C illustrate examples of different ways to physically tamper a POI document. Specifically, FIG. 2A illustrates a POI document 202 having a forged date of birth based on disposing a sticker in an area 204 of the POI document 202. As shown, the sticker completely covers the date of birth section (in the area 204) of the POI document 202 such that the original date of birth information of the POI document 202 is completely obfuscated. A fictitious date of birth is printed on the sticker such that the fictitious date of birth is visible in an image of the POI document 202 in lieu of the actual date of birth.

FIG. 2B illustrates another example of physical tampering of a POI document 212. The POI document 212 is supposed to show a small portrait (or a photo) of a person in an area 214 of the POI document 212. It is possible that another sticker covers another area that shows a large portrait (or a large photo) of the person in an area 216, to replace the large photo of the person (the person associated with the POI document 212) with a photo of another person. Instead of replacing the small portrait with another portrait, the malicious user may simply cover the area 214 with a black sticker (e.g., due to the laziness of the malicious user, it is technically more challenging to replace the small portrait because of a security feature such as a watermark on the small portrait, etc.). Thus, the small portrait with the security feature is no longer visible on the image of the POI document 212.

FIG. 2C illustrates another physical tampering example of a POI document 222. In this example, a security feature (e.g., a watermark, a particular design element, a logo, a special code the encode information about the user on the POI document 222 in a proprietary way, etc.) should appear in the area 224 of the POI document 222. However, the POI document 222 may be an illegally generated identification card and does not have such security feature, or that some of the other information on the card has been physically tampered with, and as such does not match the encoded information. Thus, a malicious user may place a sticker in the area 224 to cover the security feature in the area 224 of the POI document 224. As a result, the image of the POI document 222 does not show the security feature.

While the editing detection software can be useful in detecting documents that are forged based on digital manipulation of the images of the documents, the editing detection software often fails to detect documents that have been physically manipulated. It is because images of the documents that have been physical manipulated do not exhibit the characteristics that are typically detectable by the editing detection software (e.g., inconsistent lighting, inconsistent color contrast, etc.). Thus, to detect physical manipulation of the documents in the images, the tampering detection module 132 may identify contours in the image that correspond to possible foreign objects (e.g., objects that do not belong to the document) being placed on the documents. In some embodiments, the tampering detection module 132 may detect physical manipulation of documents in addition to detecting digital manipulation of the images of the documents. For example, the tampering detection module 132 may use the editing detection software before or after detecting physical manipulation of documents using techniques disclosed herein.

Figure 3:
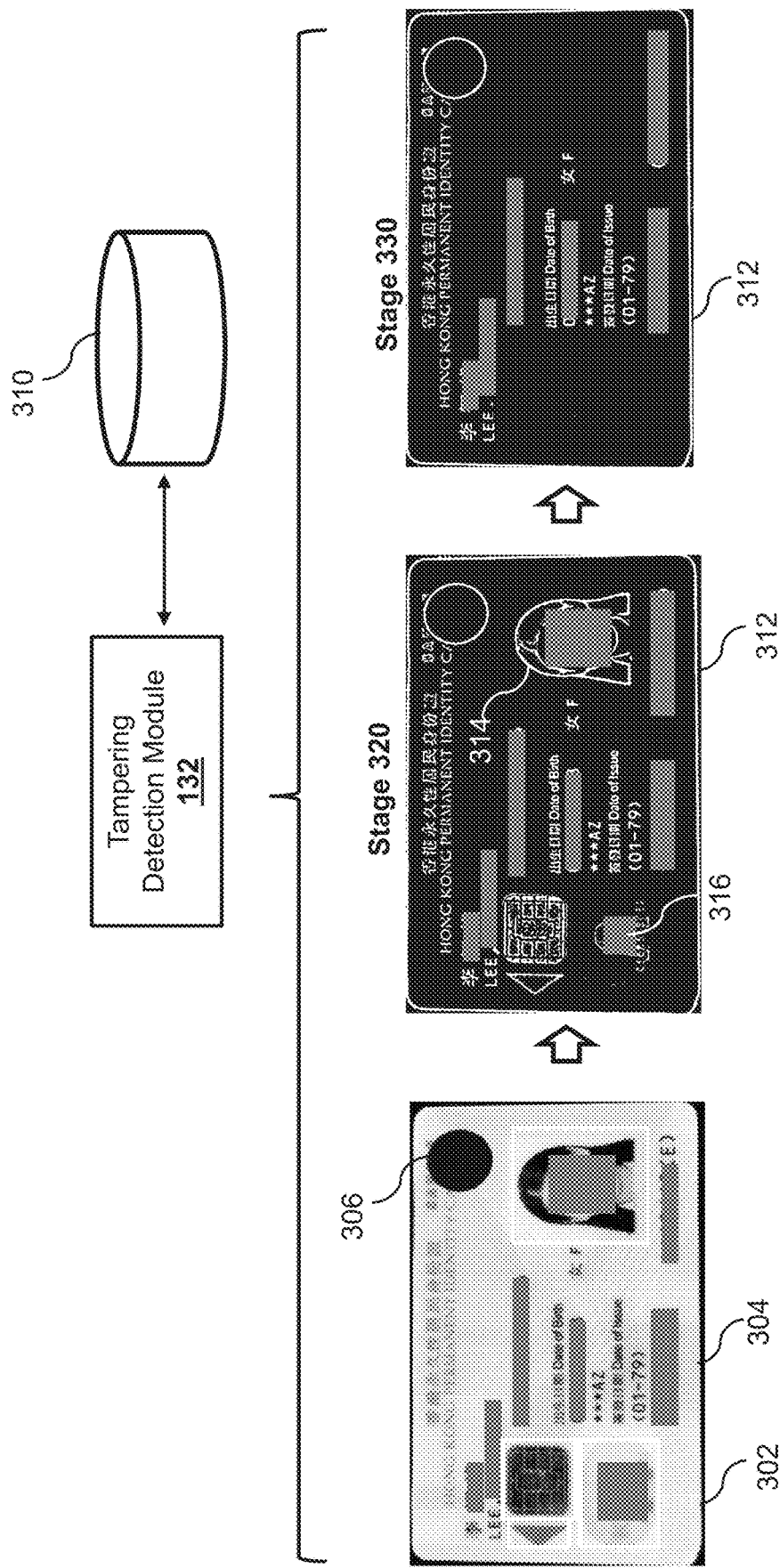
FIG. 3 illustrates an example flow of identifying contours in an image according to an embodiment of the present disclosure.

To detect physical manipulation of a document in an image, the tampering detection module 132 may first perform a set of preliminary image processing operations to the image received from a user device. FIG. 3 illustrates an example of performing the set of pre-processing operations to an image of a document received from a user device according to various embodiments of the disclosure. In the example illustrated in FIG. 3, the service provider server 130 has obtained an image 302 of a document 304 from the user device 110. The image 302 may be submitted by the user 140 in association with a transaction request (e.g., a request to register a new user account, a request to remove a restriction from a user account, a request to perform a transaction, etc.). In this example, the document is an identification card for a person that includes different information, such as a name of the person, a date of birth of the person, a gender of the person, an identification number associated with the person, portraits of the person, a microchip that stores information of the person, security features such as background designs and watermarks, etc. As shown in the figure, a foreign object (e.g., a sticker 306) has been placed on top of an area (e.g., the top right area) of the document 306. The sticker 306 may be placed on that area to cover up an important feature of the document 304. While such a physical manipulation of the document 304 using the sticker 306 can be easily detectable by human eyes, it can be a challenge to detect using a computer software. For example, the editing detection software may fail to detect such a foreign object on the document 304 based on analyzing the image 302.

As such, the tampering detection module 132 may detect any physical tampering of the document 304 using the contour examination techniques disclosed herein. In some embodiments, upon receiving the image 302, the tampering detection module 132 may perform a set of preliminary image processing operations on the image 302. For example, the tampering detection module may extract image attributes from the image 302, and classify the document 304 into one of different document types. In this regard, the tampering detection system may access a data storage 310 that stores templates of different document types. Each template may include image attributes associated with the corresponding document types. For example, the tampering detection system may access images of different types of documents prior to or after receiving the image 302. The different document types may correspond to different POI document types (e.g., a U.S. Passport, a Spanish passport, a Hong Kong Identification Card, etc.). The tampering detection system may extract image attributes associated with the different documents. The image attributes may represent a dimension of the document, a shape of the document, locations of different document element, such as a portrait, a line, a watermark, a date of birth field, etc. In some embodiments, the tampering detection system may use an edge-based object recognition algorithm (e.g., a Scale Invariant Feature Transform (SIFT) algorithm, etc.) to extract edge-based descriptors from the image. Thus, each template may include edge-based descriptors associated with the corresponding document type.

The tampering detection module 132 may then compare attributes derived from the image 302 against the attributes of the different document types to determine whether the image is a match with any one of the different document types. For example, the tampering detection module may derive edge-based descriptors from the image 302 (e.g., using the SIFT algorithm, etc.) and may compare the edge-based descriptors of the image 302 against the edge-based descriptors of the different templates to determine whether a match is found. If a match is found, the tampering detection module 132 may classify the document 304 as the document type that corresponds to the matched template. In this example, the tampering detection module 132 may classify the document 304 as a Hong Kong Identification Card based on the comparisons.

After classifying the document 304 as a particular document type, the tampering detection module 132 may prepare the image 302 for identification of different contours that may correspond to a foreign object on the document 304. For example, the tampering detection module 132 may re-orient the image 302 such that the document 304 appears up-right in the image 302, reduce noise in the image, and turning the image 302 into a grayscale image. The tampering detection module 132 may then transform the image 302 into a binary image 312 (e.g., using Gaussian adaptive thresholding) in stage 320.

As shown in stage 320 of FIG. 3, every pixel in the binary image 312 has only one of two values (e.g., 1 or 0, black or white, etc.). Using the adaptive thresholding method to transform the image 312 into the binary image 312, all of the features shown on the image 302, such as texts, the outlines of the portraits, the security features such as watermarks and other design elements on the document 304, the outline of the sticker 306, and other document features, are highlighted. The highlighted portions of the binary image 312 form the initial set of contours. Each contour is a candidate for representing a foreign object on the document 304. The remaining processing to the binary image 312 performed by the tampering detection system aims to eliminate contours that do not likely correspond to a foreign object on the document 304.

Since the document 304 has been classified into a particular document type, the tampering detection module 132 may use the attributes associated with the particular document type to mask certain features in the binary image 312 that may confuse the tampering detection module 132 as possible outlines of foreign objects. For example, when the document 304 includes a portrait or photo of a person, the contours generated based on the outline of the portrait (which may include the outlines of hair, the outline of the face and other facial features, etc.) may appear to be similar to the outlines of a foreign object on the document. As such, in some embodiments, the tampering detection module 132 may identify the area(s) (e.g., the areas 314 and 316) in the image that corresponds to a portrait (e.g., using a facial recognition algorithm or using the attributes of the particular document type, etc.), and may mask the identified areas (e.g., the areas 314 and 316) in the binary image 312 (e.g., removing all the highlights in the area). Stage 330 of FIG. 3 shows the image 312 after the tampering detection module 132 has removed all of the contours in the areas 314 and 316 corresponding to a portrait of a person.

Figure 4:
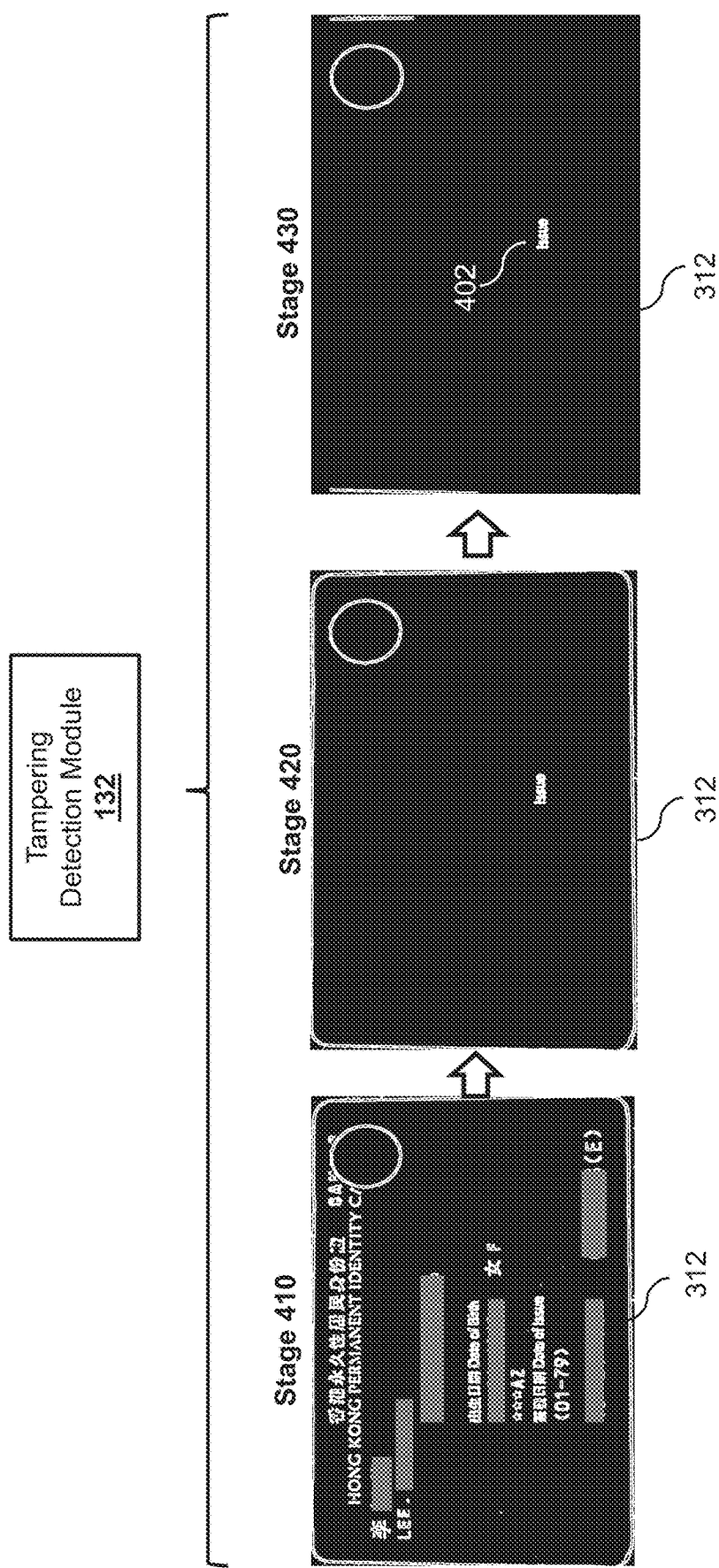
FIG. 4 illustrates an example flow of eliminating contours based on size attributes according to an embodiment of the present disclosure.

After masking the areas 314 and 316, the tampering detection module 132 may identify contours that correspond to texts on the document 304 and contours that correspond to borders of the document 304. FIG. 4 illustrates the process of identifying and eliminating contours that correspond to borders and texts of the document 304 according to various embodiments of the disclosure. Since a contour that corresponds to a border of the document may occupy a substantial dimension of the binary image 312, in some embodiments, the tampering detection module 132 may determine that a contour in the binary image 312 corresponds to a border of the document 304 when the contour has a width that exceeds a substantial portion (e.g., 40%, 50%, etc.) of the width of the binary image 312. The tampering detection module 132 may also determine that a contour in the binary image 312 corresponds to a border of the document 304 when the contour has a height that exceeds a substantial portion (e.g., 40%, 50%, etc.) of the height of the binary image 312. The tampering detection module 132 may also determine that a contour in the binary image 312 corresponds to a border of the document 304 when the contour has a size (e.g., multiplying the width by the height) that exceeds a substantial portion (e.g., 40%, 50%, etc.) of the size of the binary image 312.

Since a contour that corresponds to a text should be substantially small in size relative to the size of the document 312 for certain types of POI documents, the tampering detection module 132 may determine that a contour corresponds to a text when the contour has a width below a portion (e.g., 5%, 10%, etc.) of the width of the binary image 312 and has a height below a portion (e.g., 8%, 12%, etc.) of the height of the binary image 312. If it is determined that a contour in the binary image 312 corresponds to a border or a text of the document 304, the tampering detection module 132 may eliminate the contour from the binary image 312. In stage 410 of FIG. 4, the tampering detection module 132 determines, for each contour in the binary image 312, whether the contour corresponds to a border or a text of the document 304 based on the width attribute, the height attribute, and/or the size attribute. The tampering detection module 132 may then eliminate the contours that correspond to the border or the text of the document 304. Stage 420 of FIG. 4 illustrates the binary image 312 after the contours that were determined to correspond to texts of the document 304 have been eliminated, and stage 430 of FIG. 4 illustrates the binary image 312 after the contours that were determined to correspond to texts of the document 304 have been eliminated.

Using the width and height attributes of the contours to identify and eliminate contours that correspond to individual text element (e.g., individual letters, numerals, characters, etc.) can be very effective. However, when multiple elements within the texts (e.g., multiple alphabet letters, multiple numerals, multiple characters, etc.) are close together, the tampering detection module 132, based on the adaptive thresholding algorithm, may generate a continuous contour that spans across the multiple elements (e.g., linking multiple letters, numerals, and/or characters together). The contour that spans across multiple elements may have a size that does not fall into the text size criteria described above. As shown in stage 430 of FIG. 4, the contour 402, which corresponds to the texts "issue" on the document 304 was not eliminated in the previous process, as the contour 402 links the characters in the texts "issue" together. As such, the tampering detection module 132 of some embodiments may perform an additional text detection process based on a polygon method to detect whether any remaining contour (e.g., the contour 402) is formed by linking multiple text elements together.

Since a contour that corresponds to multiple text elements may exhibit certain curvature characteristics (e.g., a curve that changes directions in an abrupt manner, not smooth, etc.), while a contour that corresponds to an outline of a foreign object (e.g., a sticker, another document, etc.) exhibits the opposite curvature characteristics (e.g., a curve the is smooth and does not change direction abruptly multiple times, etc.), the tampering detection module 132 may perform the additional text detection process by analyzing the curvature characteristics of a contour. In some embodiments, the tampering detection module 132 may approximate the contour (e.g., the contour 402) to a polygon with less vertices based on a parameter.

Figure 5:
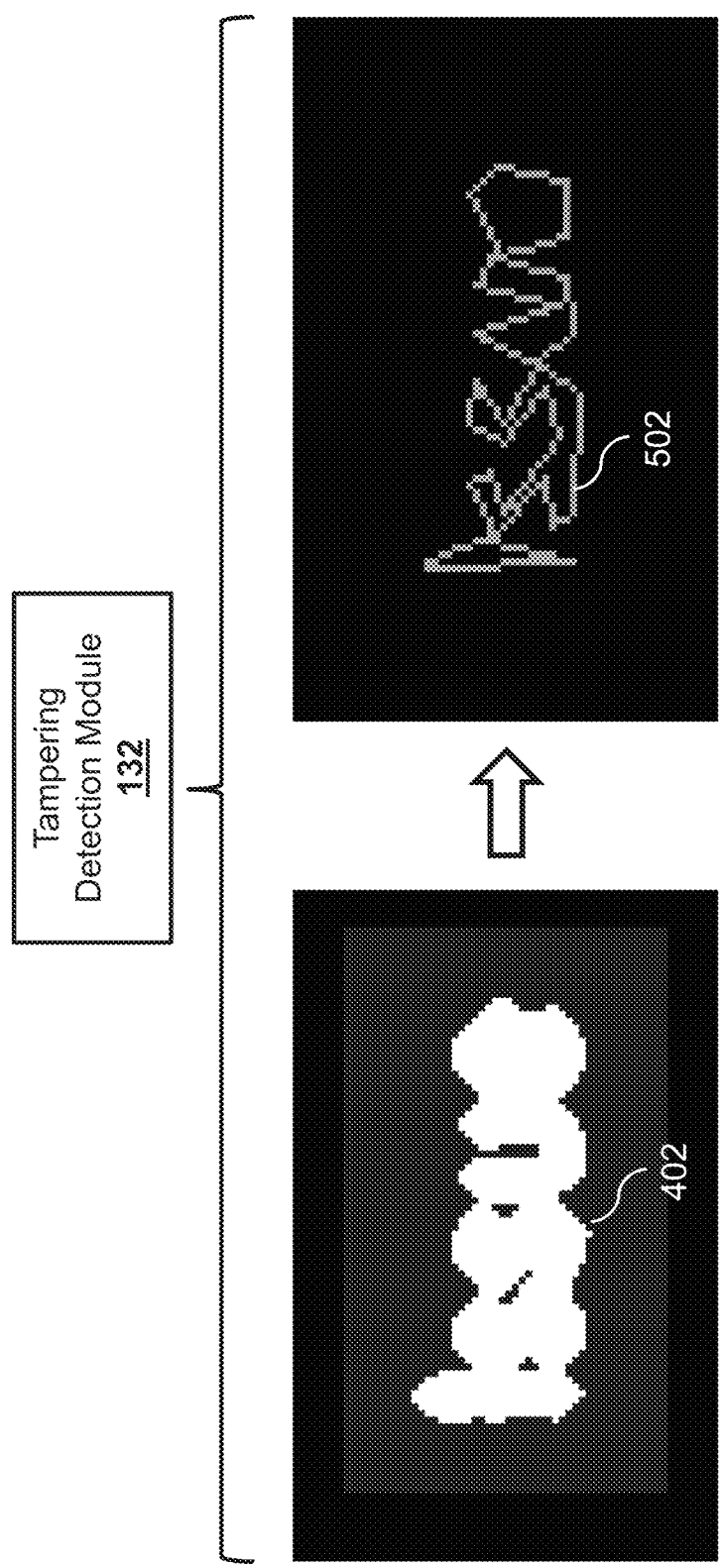
FIG. 5 illustrates an example of using a polygon technique to identify contours corresponding to texts according to an embodiment of the present disclosure.

Given a contour can be constructed based on connecting many points using straight lines (the more points provided for connecting the straight lines, the smoother it looks), the tampering detection module 132 may initially identify multiple points on the contour (e.g., 20 points, 50 points, 100 points, etc.). The tampering detection module 132 may then reduce the granularity of the contour (e.g., by discarding one or more points on the contour). In some embodiments, the tampering detection module 132 may recursively reduce the granularity of the contour until a pre-defined condition exists. For example, the tampering detection module 132 may discard a point on the contour when the point is within a threshold distance from a hypothetical straight line that connects two other points that surround the point (e.g., when the point is along a continuous transition of the contour). In some embodiments, the threshold distance may be determined based on a perimeter length of the contour (e.g., a length of the perimeter of an area in the binary image occupied by the contour). For example, the tampering detection module 132 may calculate the threshold distance based on multiplying a weight (e.g., 0.05, etc.) by the perimeter length. In some embodiments, the tampering detection module 132 may use the Douglas-Peucker algorithm to reduce the granularity of the contour, and may determine the epsilon parameter based on the weight and the perimeter length (e.g., multiplying the weight by the perimeter length, etc.). FIG. 5 illustrates the transformation from the contour 402 to a polygon 502 using the techniques described herein. As shown, the polygon 502 is a polygon that approximates the contour 402. The polygon 502 is substantially less granular than the contour 402 due to the removal of multiple points on the contour 402. The polygon 502 appears to be more angular and includes distinct vertices and edges.

Since a contour that corresponds to texts includes more abrupt changes in directions than a contour that corresponds to an outline of a foreign object, the tampering detection module 132 may determine whether a contour corresponds to texts based on the number of points (vertices) remaining in the resulting contour (e.g., the polygon 502). For example, the tampering detection module 132 may determine that the contour corresponds to texts when the number of points remaining in the resulting contour is above a threshold (e.g., 15, 19, 20, 27, etc.). In this example, the tampering detection module 132 may determine that the polygon 502 (after reducing the granularity of the contour 402) has 35 vertices, which exceeds the threshold (e.g., 19). Thus, the tampering detection module 132 may then eliminate the contour 402 from the binary image 312.

Figure 6:
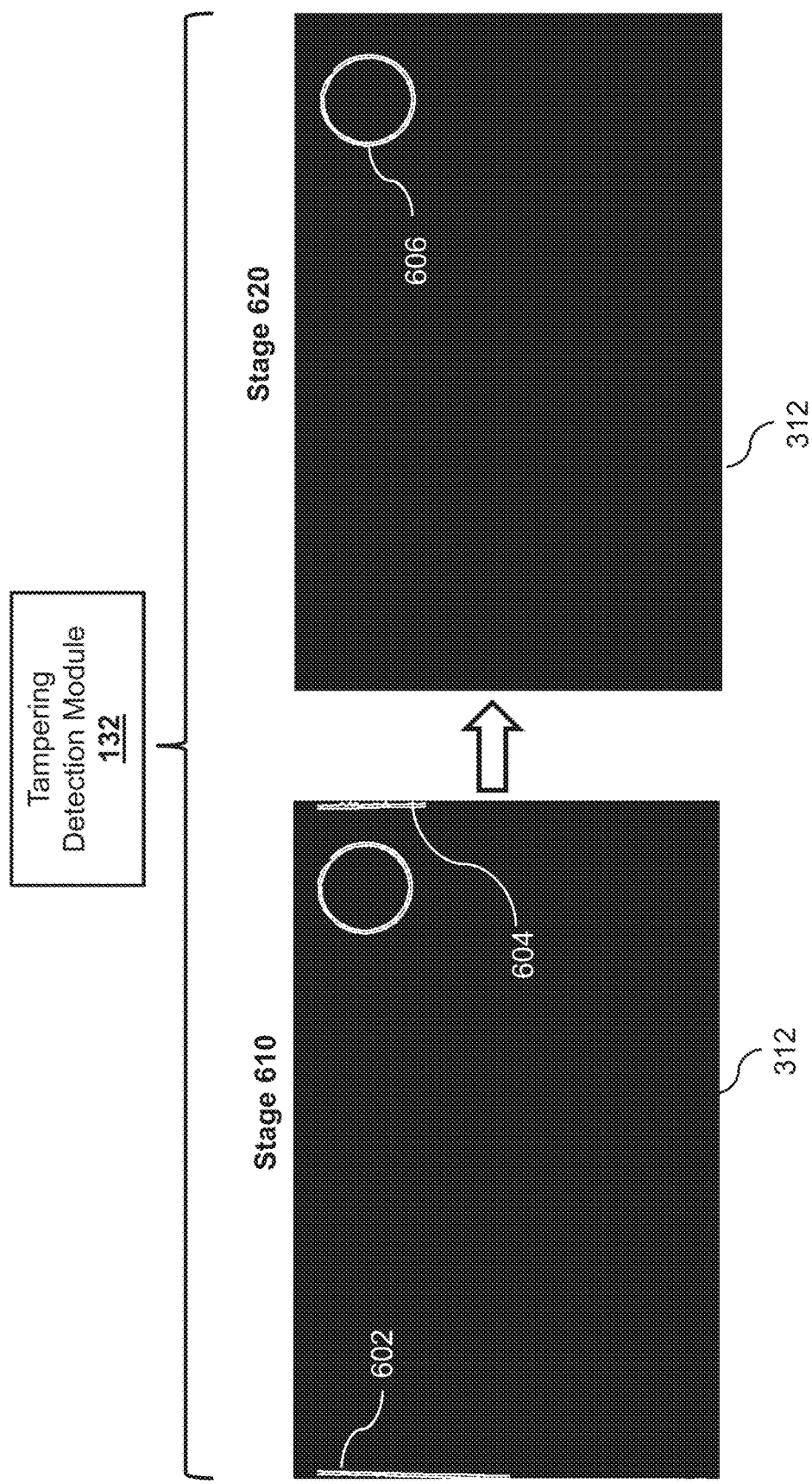
FIG. 6 illustrates an example of performing a second round of contour examination according to an embodiment of the present disclosure.

In some embodiments, after eliminating the contours that correspond to the borders and the texts of the document 304 in the binary image 312, the tampering detection module 132 may perform another round of examination to clean up residual contours that are unlikely to correspond to outlines of foreign objects on the document 304. FIG. 6 illustrates an example of performing the second round of examination for the binary image 312 according to various embodiments of the disclosure. In some embodiments, the tampering detection module 132 may mask areas in the binary image 312 that are close to the borders and the corners of the binary image 312 (e.g., within 5%, 8%, etc. from the border or corner of the binary image 312, etc.). In this example, in stage 610 of FIG. 6, the tampering detection module 132 may mask contours 602 and 604 in the binary image since the contours 602 and 604 are within the threshold distance from the border of the binary image 312. In some embodiments, the tampering detection module 132 may also eliminate any small (e.g., having a size smaller than a threshold size) that also do not likely correspond to outlines of foreign objects in the binary image 312. For example, the tampering detection module 132 may eliminate any remaining contours having a width attribute below a threshold (e.g., 5%, 8%, of the width of the binary image 312, etc.) and a height attribute below a threshold (e.g., 3%, 6% of the height of the binary image 312, etc.).

Stage 620 of FIG. 6 illustrates the binary image 312 after the second round of examination. As shown, the contours 602 and 604 have been eliminated from the binary image, and only contour 606 remains in the binary image 312. After eliminating the contours in the binary image 312 using the process and techniques disclosed herein, any remaining contour(s) in the binary image 312 would likely correspond to an outline of a foreign object on the document. As such, the tampering detection module 132 may determine whether any contour remains in the binary image. If one or more contours remain in the binary image 312, the tampering detection module 132 may determine that the document 304 captured in the image 302 has been physically tampered with. By contrast, if no contour remains in the binary image 312, the tampering detection module 132 may determine that the document 304 has not been tampered with. In this example, the tampering detection module 132 may determine that the document 304 has been physically manipulated and not trustworthy based on the contour 606 remaining in the binary image 312 after the examination process.

In some embodiments, if the image 302 was obtained in association with a transaction request from the user 140, the tampering detection module 132 (or another module within the service provider server 130) may process a corresponding transaction request based on the determination of whether the document 304 is a forged document based on digital manipulation or physical manipulation. For example, the tampering detection system may deny the transaction request (e.g., denying the user from signing up a user account, denying the user from upgrading the user account, denying the user access to data, etc.) or imposing restrictions (e.g., limit a transaction amount, etc.) on the user account when it is determined that the document 304 was forged or manipulated. On the other hand, if the tampering detection module 132 determines that the document 304 was not forged and is trustworthy, the tampering detection module 132 (or another module within the service provider server 130) may extract information from the document 304. For example, the tampering detection module 132 may extract personal information, such as a name, a date of birth, a gender, etc. from the document 304 using an optical character recognition algorithm. The tampering detection module 132 (or another module of the service provider server 130) may then process the transaction request based on the extracted information.

Figure 7:
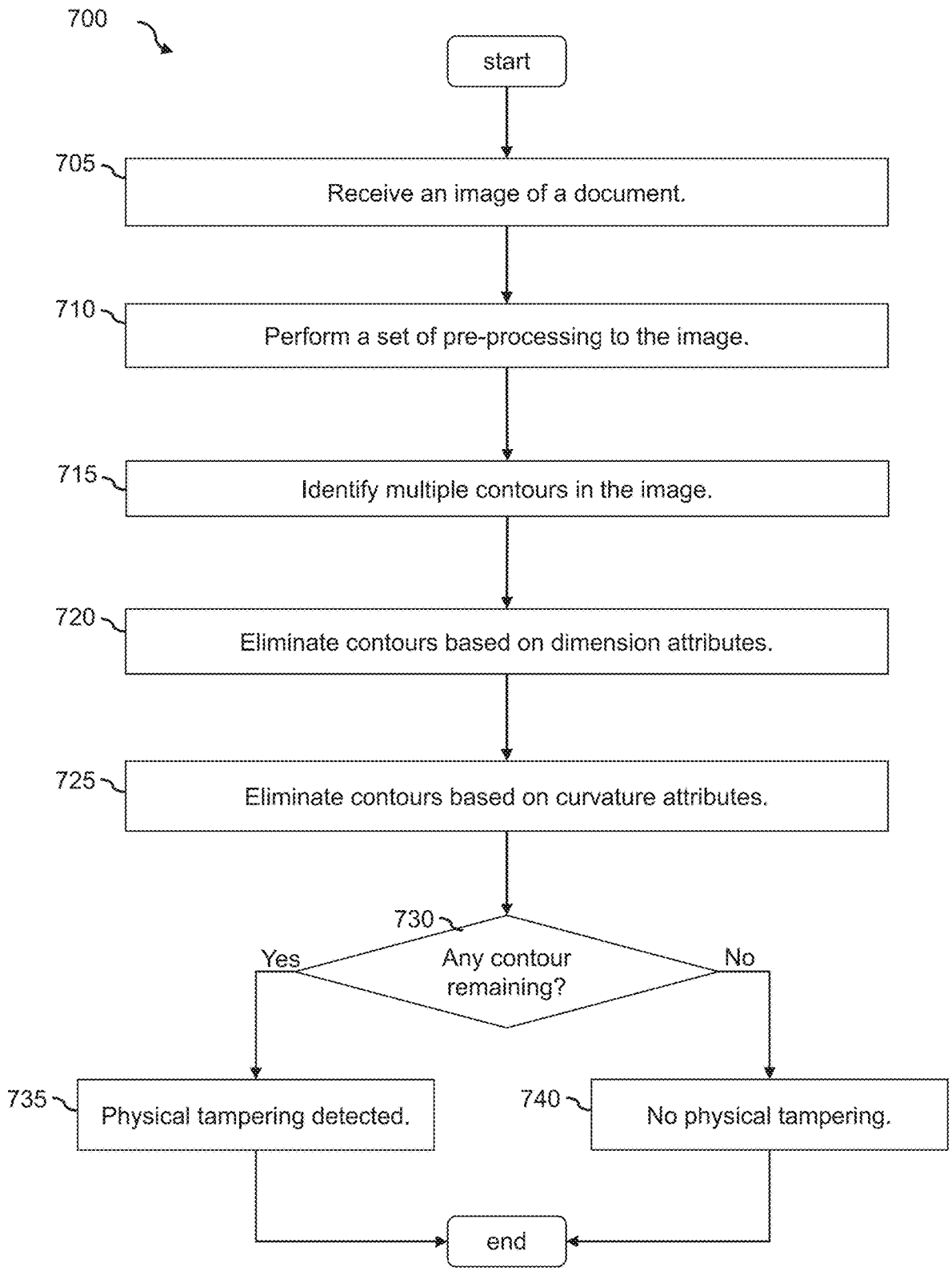
FIG. 7 is a flowchart showing a process of detecting physical tampering of a document according to an embodiment of the present disclosure.

FIG. 7 illustrates a process 700 for detecting physical tampering of a document in an image according to various embodiments of the disclosure. In some embodiments, at least a portion of the process 700 may be performed by the tampering detection module 132. The process 700 begins by receiving (at step 705) an image of a document. For example, the service provider server 130 may receive the image 302 of the document 304 from the user device 110. The receipt of the image 302 may be in association with a transaction request submitted by the user 140 of the user device 110.

The process 700 then performs (at step 710) a set of pre-processing operations to the image. For example, the tampering detection module 132 may perform a set of image processes to the image 302, including classifying the document 304 as a particular document type based on image attributes extracted from the image 302, re-orientation of the image 302, noise reduction, and converting the image 302 from multiple color channels to a single color channel.

The process 700 then identifies (at step 715) multiple contours in the image. For example, the tampering detection module 132 may transform the image 302 into a binary image 312 using an adaptive thresholding technique (e.g., a Gaussian adaptive thresholding algorithm). By converting the image 302 into the binary image 312, the outlines of all of the features in the document 304, such as the texts, lines, background designs, portraits, and other features would be highlighted. The tampering detection module 132 may identify every continuous highlighted portion in the binary image 312 as a contour.

After identifying the contours, the process 700 eliminates (at step 720) contours based on dimension attributes and eliminates (at step 725) contours based on curvature attributes. Each contour may be a candidate of an outline of a foreign object on the document 304, which indicates a possibility of a physical tampering of the document 304. However, many of the contours identified in the binary image 312 may correspond to features other than an outline of a foreign object. Thus, the tampering detection module 132 may eliminate contours that do not likely correspond to an outline of a foreign object on the document 304. In some embodiments, the tampering detection module 132 may eliminate contours that likely correspond to texts on the document 304 and borders of the document 304 based on the dimension attributes (e.g., a width, a length, a size, etc.) of the contours. For example, the tampering detection module 132 may determine that a contour having a width and height smaller than a threshold likely corresponds to a text, and a contour having a width, a height, or a size larger than a threshold likely correspond to a border of the document 304.

However, the tampering detection module 132 may generate a contour that links multiple text elements together when the text elements (e.g., multiple letters, alphabets, and/or characters, etc.) are too close together on the document 304. To eliminate those contours that link multiple text elements together, the tampering detection module 132 of some embodiments may use a polygon technique to identify contours with specific curvature attributes (e.g., too many abrupt changes in directions, etc.).

The process 700 then determines (at step 730) whether there is any contour remaining, and determines (at step 735) that physical tampering is detected when there is at least one contour is remaining and determines (at step 740) that no physical tampering is detected when no contours are remaining.

Figure 8:
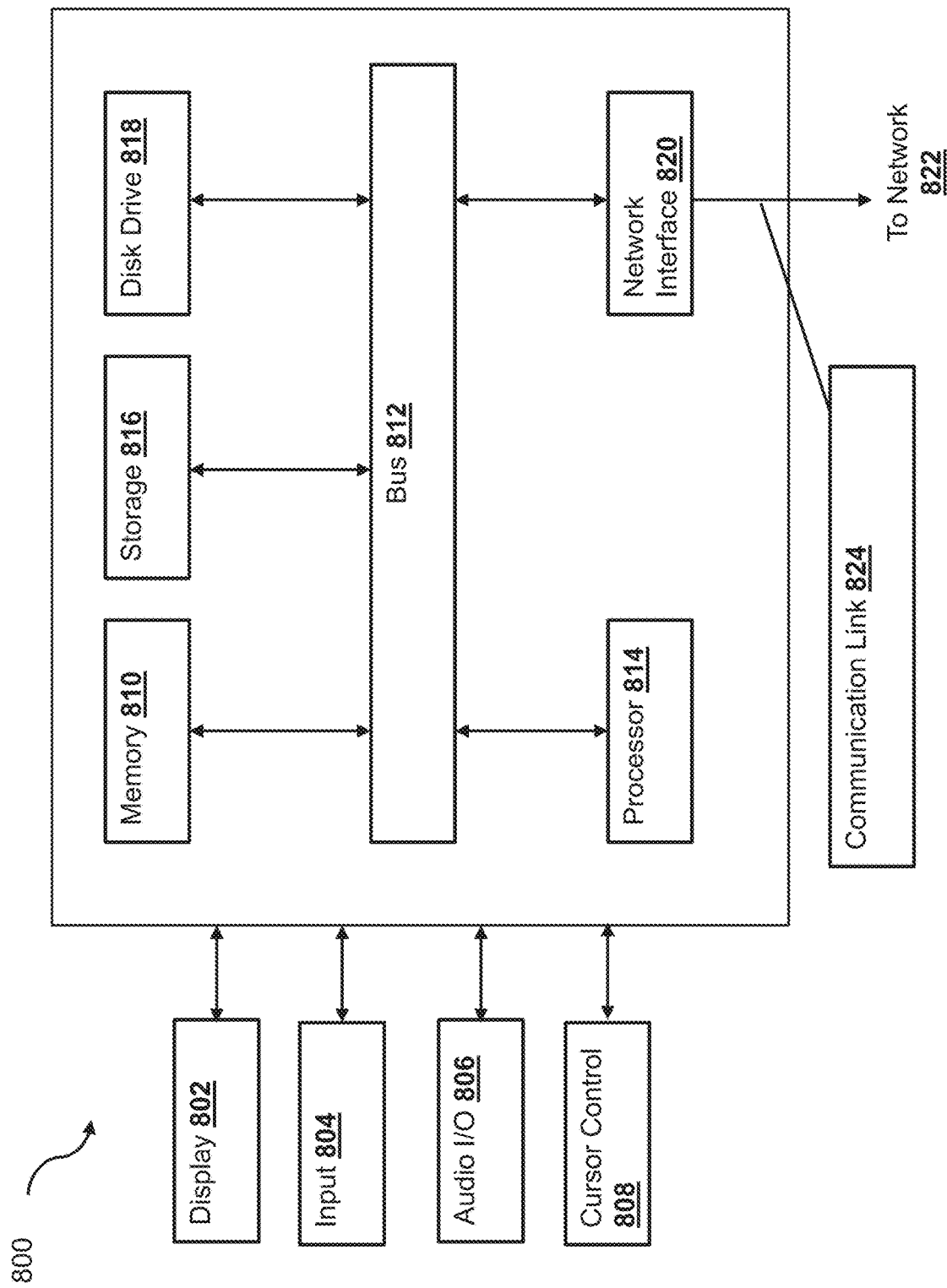
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the tampering detection functionalities described herein, for example, according to the process 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
transforming an image of a document into a binary image;
identifying a plurality of contours in the binary image;
eliminating, from the plurality of contours, one or more contours having a size attribute within a threshold deviation from a size of the binary image;
determining, for a first contour in the plurality of contours, a curvature attribute;
determining whether to eliminate the first contour from the binary image based on the curvature attribute; and
determining whether the document has been physically tampered with based on a number of contours remaining in the binary image.

2. The system of claim 1, wherein the operations further comprise:
determining that the document has been physically tampered with based on the number of contours remaining in the binary image exceeding a threshold number.

3. The system of claim 1, wherein the operations further comprise:
determining that the size attribute of the one or more contours exceeds a threshold percentage of the size of the binary image, wherein the one or more contours are eliminated based on the determining that the size attribute of the one or more contours exceeds the threshold percentage of the size of the binary image.

4. The system of claim 1, wherein the operations further comprise:
eliminating, from the plurality of contours, one or more second contours having a second size attribute below a threshold percentage of the size of the binary image.

5. The system of claim 1, wherein the operations further comprise:
determining a plurality of points on the first contour;
discarding one or more points from the plurality of points using a granularity reduction algorithm; and
determining a number of points remaining in the first contour.

6. The system of claim 5, wherein the operations further comprise eliminating the first contour from the image when the number of points remaining in the first contour exceeds a threshold.

7. The system of claim 1, wherein the operations further comprise:
eliminating, from the plurality of contours, at least one contour based on a position of the at least one contour being within a threshold distance from a border of the document within the binary image.

8. A method comprising:
transforming, by one or more hardware processors, an image of a document into a binary image;
identifying, by the one or more hardware processors, a plurality of contours in the binary image;
eliminating, by the one or more hardware processors and from the plurality of contours in the binary image, one or more first contours having a size attribute within a threshold deviation from a size of the binary image;
subsequent to the eliminating, determining, by the one or more hardware processors, a number of contours remaining in the binary image; and
determining, by the one or more hardware processors, whether the document has been physically manipulated based on the number of contours remaining in the binary image.

9. The method of claim 1, further comprising:
receiving, from a user device, a transaction request associated with a user account with a service provider, wherein the image is associated with the transaction request.

10. The method of claim 9, further comprising:
determining that the document has been physically manipulated based on at least one contour remaining in the binary image; and
denying the transaction request.

11. The method of claim 9, further comprising:
determining that the document has not been physically manipulated based on a determination that no contours remain in the binary image;
extracting information from the image of the document; and
processing the transaction request based on the extracted information.

12. The method of claim 8, further comprising:
analyzing curvature characteristics of a first contour from the plurality of contours in the binary image; and
determining whether the first contour corresponds to a plurality of text elements based on the analyzing the curvature characteristics.

13. The method of claim 12, further comprising:
eliminating the first contour from the binary image in response to determining that the first contour corresponds to the plurality of text elements.

14. The method of claim 8, further comprising:
eliminating, from the binary image, one or more second contours located within a threshold distance from a border of the document within the binary image.

15. A non-transitory machine-readable medium having stored thereon machine-readable instructions executable to cause a machine to perform operations comprising:
transforming an image of a document into a binary image;
identifying a plurality of contours in the binary image;
eliminating, from the plurality of contours, one or more contours having a size attribute within a threshold deviation from a size of the binary image;
determining, for a first contour in the plurality of contours, a curvature attribute;
determining whether to eliminate the first contour from the binary image based on the curvature attribute; and
determining whether the document has been physically manipulated based on a number of contours remaining in the binary image.

16. The non-transitory machine-readable medium of claim 15, wherein the operations further comprise:
determining that the document has been physical manipulated based on the number of contours remaining in the binary image exceeding a threshold number.

17. The non-transitory machine-readable medium of claim 15, wherein the operations further comprise:
determining that the size attribute of the one or more contours exceeds a threshold percentage of the size of the binary image, wherein the one or more contours is eliminated based on the determining that the size attribute of the one or more contours exceeds the threshold percentage of the binary image.

18. The non-transitory machine-readable medium of claim 15, wherein the operations further comprise:
eliminating, from the plurality of contours, one or more second contours having a second size attribute below a threshold percentage of the size of the binary image.

19. The non-transitory machine-readable medium of claim 15, wherein the operations further comprise:
analyzing the curvature attribute of the first contour; and
determining whether the first contour corresponds to a plurality of text elements based on the analyzing the curvature attribute.

20. The non-transitory machine-readable medium of claim 19, wherein the operations further comprise:
eliminating the first contour from the image in response to determining that the first contour corresponds to the plurality of text elements.

* * * * *